United States Patent [19]
Brickner et al.

[11] 3,979,090
[45] Sept. 7, 1976

[54] VELOCITY DAMPED ERECTION SYSTEM FOR STABLE GYROSCOPIC ATTITUDE AND HEADING REFERENCE APPARATUS

[75] Inventors: David R. Brickner; James S. Johnson, both of Phoenix, Ariz.

[73] Assignee: Sperry Rand Corporation, New York, N.Y.

[22] Filed: Mar. 17, 1975

[21] Appl. No.: 558,868

[52] U.S. Cl. .................. 244/175; 33/321; 73/178 R; 74/5.34; 74/5.47; 235/150.25; 244/191; 318/649; 318/651
[51] Int. Cl.² ............ G05D 1/00; B64C 13/18
[58] Field of Search .......... 73/178 R; 33/321; 74/5.34, 5.41, 5.47, 5.5; 235/150.25; 244/3.2, 14.77 R, 77 D, 77 B, 77 G, 79, 165, 175, 177, 181, 191; 318/580, 584, 585, 648, 649, 651, 661

[56] References Cited
UNITED STATES PATENTS

| | | | |
|---|---|---|---|
| 2,995,318 | 8/1961 | Cocharo | 74/5.34 X |
| 3,028,592 | 4/1962 | Parr et al. | 244/77 G X |
| 3,167,763 | 1/1965 | Barkalow et al. | 74/5.47 X |
| 3,648,525 | 3/1972 | Reed | 74/5.34 |

*Primary Examiner*—Stephen G. Kunin
*Attorney, Agent, or Firm*—Howard P. Terry

[57] ABSTRACT

An improved second order gyroscopic attitude and heading reference system including separate variable time constant accelerometer integrators for independently controlling the velocity error signals associated with respective east and north acceleration signals to provide velocity damped output signals so that a high acceleration input signal of dubious accuracy will have minimal precessional authority while a lower acceleration input signal of greater accuracy will retain nominal control.

7 Claims, 2 Drawing Figures

3,979,090

VELOCITY DAMPED ERECTION SYSTEM FOR STABLE GYROSCOPIC ATTITUDE AND HEADING REFERENCE APPARATUS

BACKGROUND OF THE INVENTION

1. Field of the Invention

The invention pertains to erection controls for precision gyroscopic stable platforms for providing precise attitude information relative to the vertical, and is also applicable to gyroscopic platforms for providing information about three mutually perpendicular reference axes with respect to a mobile craft; the invention provides a control arrangement for eliminating certain defects of the prior art whereby accelerometer errors cause the stable platform to be precessed in error.

2. Description of the Prior Art

The present invention is an improvement useful in stable gyroscopic platforms of the general type described in Charles B. Reed U.S. Pat. No. 3,648,525 for a "Gyroscopic Stable Reference Apparatus", issued Mar. 14, 1972 and assigned to the Sperry Rand Corporation. The present invention is also related generally to that disclosed in the J. R. Erspamer U.S. Pat. No. 3,931,747 for a "Gyroscopic Stable Reference Device", issued Jan. 13, 1976 and assigned to the Sperry Rand Corporation.

The invention of the Reed patent utilizes a relatively simple mechanical construction having five gyroscopically stabilized gimbals and only one servoed gimbal, thereby providing a stable platform relatively inexpensive, simple to manufacture, and reliable in operation. The gimballing arrangement of stable references like the Reed device provides an all-attitude capability, at the same time additionally yielding accurate attitude information with respect to the three orthogonal axes of the craft on which it is mounted. By stabilizing the directional gyroscope of the instrument in both pitch and roll, heading information is provided generally free from the gimbal errors of a conventionally mounted directional gyroscope.

While the original Reed device is a quite satisfactory instrument in many applications, it has certain defects of complex origin, some of which have been overcome, as described in the Erspamer application, and some of which evidence themselves more fully in precision airborne applications of the instrument. The defects of the prior art concepts will be developed in greater detail as the description of the invention progresses.

SUMMARY OF THE INVENTION

Like the Reed and kindred devices, the present invention operates with a stable reference configuration having five gyroscopic gimbals and a single servo system, a configuration that is relatively easy to manufacture, relatively inexpensive, and reliable. The gimbal arrangement again provides an all-attitude capability and precise roll, pitch, and heading attitude data about three mutually perpendicular craft axes. Heading data substantially free of the effects of gimbal errors is generated. Control systems previously employed in such systems as the Reed device used pendulous accelerometers and provided complete cut off of the accelerometer-derived erection signals whenever the output of either of the two accelerometers they employed exceeded a predetermined level. In the present invention, this cooperative cut off level is raised to a value slightly below the level of accelerometer saturation, while providing diminishing accelerometer authority as a function of resolved accelerometer data over a range extending substantially from the previously employed cut off level to a new and much higher predetermined cut off level and thereby fully optimizing use of the pendulous accelerometer data. Acceptance of low level but relatively accurate accelerometer data is afforded while rejecting higher level but progressively less accurate accelerometer data. The advantages of the present invention with respect to the complex defects of the prior art will be discussed in further detail hereinafater.

DESCRIPTION OF THE PREFERRED EMBODIMENTS

Figure 1A:
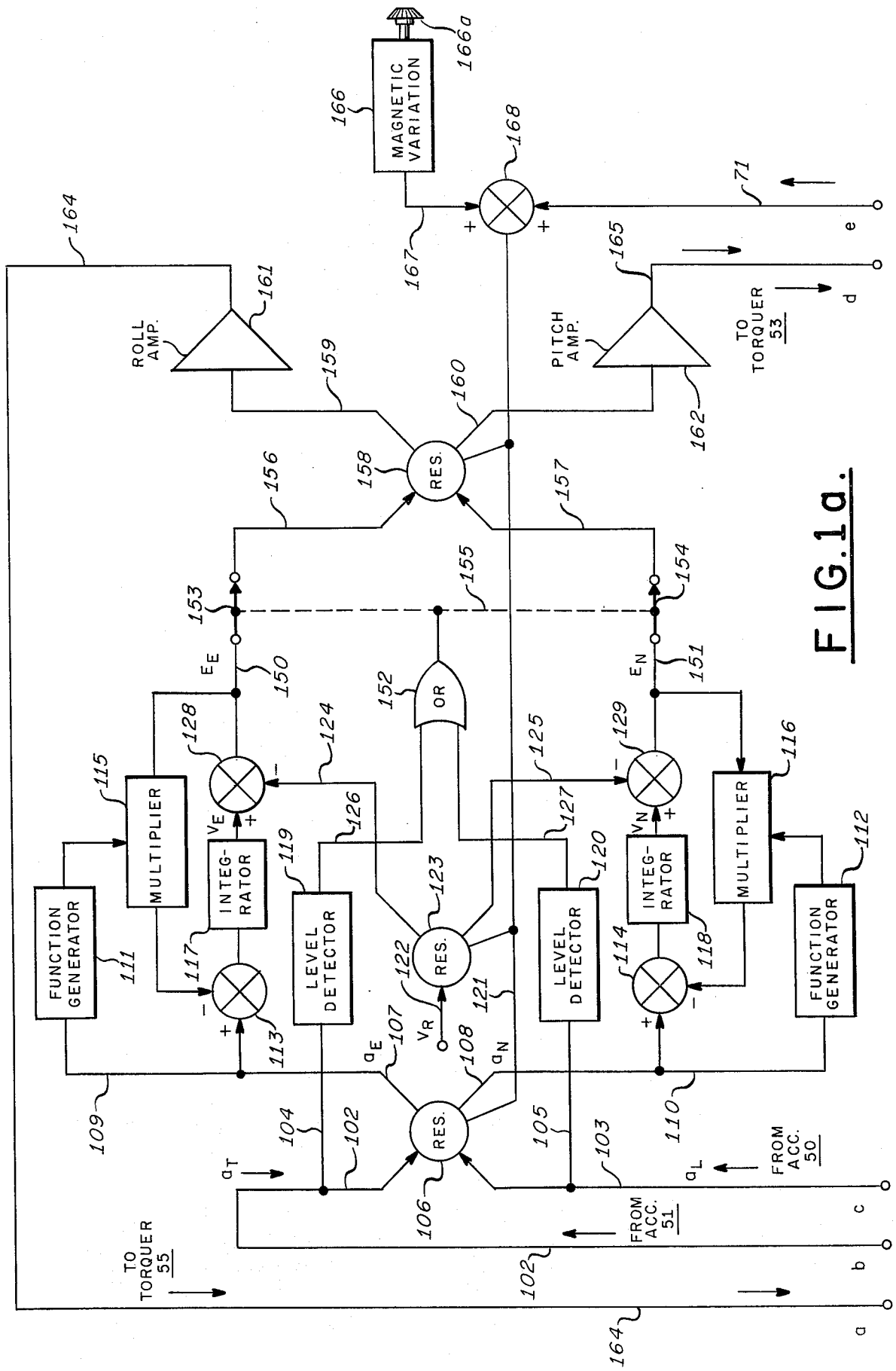
FIG. 1A is a diagram of the navigation signal processing apparatus of the invention showing its components and their electrical interconnections.

The novel navigation signal processing system of the present invention will be discussed in connection with FIG. 1A as related to FIG. 1B which is supplied to illustrate clearly how the signal processing system cooperates with a stable gyroscopic reference of the type disclosed, for example, in the aforementioned Reed patent. Referring first particularly to FIG. 1B, a three axis stable gyroscopic system 10 is mounted for rotation with respect to supports 11 that are fixed on a base 12 such as an aircraft, for example. The outer roll gimbal 13 of stable platform 10 is mounted for rotation about an axis preferably coincident with the fore-aft or roll axis 14 about which craft 12 rolls. The outer roll gimbal 13 is pivotally mounted to rotate about axis 14 by means of spaced bearings 15 and 16. The pitch gimbal 20 of the stable platform 10 is mounted on outer roll gimbal 13 by means of spaced bearings 21 and 22 for rotation about an axis 23 perpendicular to roll axis 14. The axis 23 is normally parallel with the athwartship axis about which craft 12 pitches.

The pitch gimbal 20 cooperates with a vertical gyroscope 24 having its inner gimbal 25 pivotally mounted to rotate with respect to pitch gimbal 20 by means of spaced bearings 26 and 27 around inner roll axis 28 normally parallel to axis 14. The rotor assembly 30 of vertical gyroscope 24 is, in turn, rotatably mounted by means of spaced bearings 32 and 33 to spin about a normally vertical spin axis 31 within inner gimbal 25.

A directional gyroscope 35 is also mounted within pitch gimbal 20 to provide azimuthal reference information. The directional gyroscope 35 is mounted on the portion of pitch gimbal 20 which extends beyond axis 23 and preferably below vertical gyroscope 24 in order that the directional gyroscope 35 is not subject to temperature variations which would otherwise be caused by the proximity of vertical gyroscope 24. The outer or azimuth gimbal 36 of directional gyroscope 35 is pivotally mounted for rotation about an azimuth axis 37 by means of spaced bearings 38 and 39. The azimuth axis 37 is normally maintained coincident with the vertical spin axis 31 of vertical gyroscope rotor 30. The inner gimbal 46 is pivotally mounted within outer gimbal 36 by means of spaced bearings 43 and 44 for rotation about axis 45. The rotor assembly of directional gyroscope 35 is, in turn, mounted to spin about a normally horizontal axis 47 within inner gimbal 46 by means of spaced bearings 48 and 49.

Preferably, the respective pitch and roll accelerometers 50 and 51 are mounted on pitch gimbal 20 to sense tilt of gimbal 20 from the vertical position. The pitch and roll accelerometers 50 and 51 may, for example, be of the annular type disclosed in U.S. Pat. No. 3,604,275 entitled "Toroidal Electrolytic Sensor" to T. S. Fox and G. W. Driskill, issued Sept. 15, 1971 and assigned to the Sperry Rand Corporation. These simple and inexpensive toroidal instruments are fully adequate for use in the present invention, readily replacing more sophisticated and expensive linear accelerometers often used in prior art stable gyroscopic references. Such toroidal acceleration pick offs are further discussed in the U.S. Pat. No. 3,823,486 to G. A. Bhat and C. G. Buckley for a "Toroidal Electrolytic Sensor and Method of Manufacture", issued July 16, 1974 and assigned to the Sperry Rand Corporation. The output of pitch accelerometer 50 is coupled via lead 103 to a first input of the signal processor of FIG. 1A, wherein it is subjected to an error-correcting manipulation yet to be explained and which ultimately produces a proper signal for coupling to the conventional pitch erection control amplifier 162 and lead 165 for providing a control signal to the precession torque motor 53 of FIG. 1B, thereby erecting rotor assembly 30 to maintain the spin axis 31 of the latter in the vertical direction. Similarly, the output of the roll accelerometer 51 in FIG. 1B is coupled via lead 102 to a second input of the signal processor of FIG. 1A, wherein it is correspondingly subjected to error correction to produce a proper signal for coupling through the conventional roll erection control amplifier 161 and lead 164, thereby providing a proper control signal to precession torquer 55 for maintaining the spin axis 31 of the rotor assembly 30 in vertical alignment.

An inner roll gimbal pick off 60 is mounted so as to sense rotation of the inner gimbal 25 with respect to pitch gimbal 20; it provides a signal via roll follow-up servo amplifier 61 to a direct current servo motor 62 mounted to rotate outer roll gimbal 13 about the axis 14. The spin axis 47 of directional gyroscope 35 is maintained at right angles to its outer gimbal rotation axis 37 by means of pick off 59, which device provides a signal to leveling torque motor 63 for precessing the directional gyro rotor assembly within gimbal 46 in a conventional manner. Pitch and roll attitude reference signals are provided at leads 72 and 73 by conventional pitch and roll output resolvers 64 and 65 mounted on the outer roll gimbal 13 with respect to axes 23 and 14, respectively. An azimuthal reference signal is provided on lead 71 by an azimuth output resolver 66 mounted on the pitch gimbal 20 that is responsive to the movement of the azimuth gimbal 36 with respect to the azimuth axis 37. According to the invention, the azimuth signal of lead 71 is supplied to the signal processor of FIG. 1A for use therein in performing the novel error correcting function yet to be described.

In operation of the apparatus as thus far described during unaccelerated aircraft flight, for example, the spin axis 31 of vertical gyroscope 24 is maintained in a vertical direction by the independent pitch and roll erection systems. Tilt about pitch axis 23 is sensed by pitch accelerometer 50 to provide a signal representative of the magnitude and sense of the tilt for amplification by pitch erection control amplifier 162 and then for application to the pitch precession torque motor 53, thereby causing precession of vertical gyroscope rotor assembly 30 in a direction to maintain the spin axis 31 thereof vertical. In a similar manner, tilt about roll axis 14 is sensed by roll accelerometer 51 to provide a roll signal that is amplified in the amplifier 161 and is applied to the roll precession torque motor 55 in a sense to maintain the spin axis 31 of gyroscope 24 vertical.

One of the features of the gyroscopic platform is that the directional gyroscope 35 is mounted on the stabilized pitch gimbal 20 of vertical gyroscope 24. By maintaining the outer gimbal axis 37 in a vertical orientation; i.e., by pitch and roll stabilization, improved free gyroscope drift performance and elimination of directional gyroscope gimballing errors are achieved. The vertical gyroscope 24 preferably has an angular momentum substantially greater than that of the directional gyroscope 35. With the directional gyroscope 35 mounted on the pitch gimbal 20 of the vertical gyroscope 24, the former is physically stabilized in pitch because of the high angular momentum of the rotor of the vertical gyroscope 24 with respect to that of the directional gyroscope 35. Roll drift uncertainty is reduced through use of a vertical gyroscope with a high angular momentum rotor for stabilizing the relatively low angular momentum rotor directional gyroscope. Further, the configuration substantially eliminates pitch draft uncertainty by servo-positioning the directional gyroscope 35 about roll axis 14 by means of the single roll follow-up servo system comprising pick off 60, roll servo motor amplifier 61, and direct current motor 62. Thus, by stabilizing the directional gyroscope 35 in pitch and roll, a heading or azimuthal output is provided on output lead 71 substantially free from the intercardinal gimbal errors of a conventional unstabilized directional gyroscope. The azimuth output may be further corrected by supply of appropriate signals to electronic system 70 in the conventional manner.

The gyroscopic system may also be viewed from another aspect in which the vertical gyroscope 24 is considered to be a three-gimbal device obtained by transforming a conventional two-gimbal vertical gyroscope by rotation 90° in azimuth, adding an outer or redundant servoed gimbal 13. The problems of mass shift normally associated with the pitch axis of a two-gimbal vertical gyroscope manifest themselves as roll drift uncertainties in the three-gimbal vertical configuration. As a result, the three-gimbal gyroscope has a significantly reduced susceptibility to lateral in-flight (turning) accelerations, but possesses relatively higher sensitivity to fore-aft accelerations. However, a total over-all performance advantage is obtained with the three-gimbal gyroscope configuration. The vertical gyroscope inner roll gimbal 25 serves as a housing for rotor 30 and is stabilized about inner roll axis 28 by the angular momentum of gyroscope rotor 30. The pitch gimbal 20 is stabilized by the gyroscope rotor angular momentum about pitch axis 23 and by the servo loop about the inner roll axis 28. Because directional gyroscope 35 is located on pitch gimbal 20, it is stabilized in the same manner; this arrangement prevents the gimbal mass uncertainty torques of directional gyroscope 35 from affecting the vertical gyro drift rate about pitch axis 23.

Figure 1B:
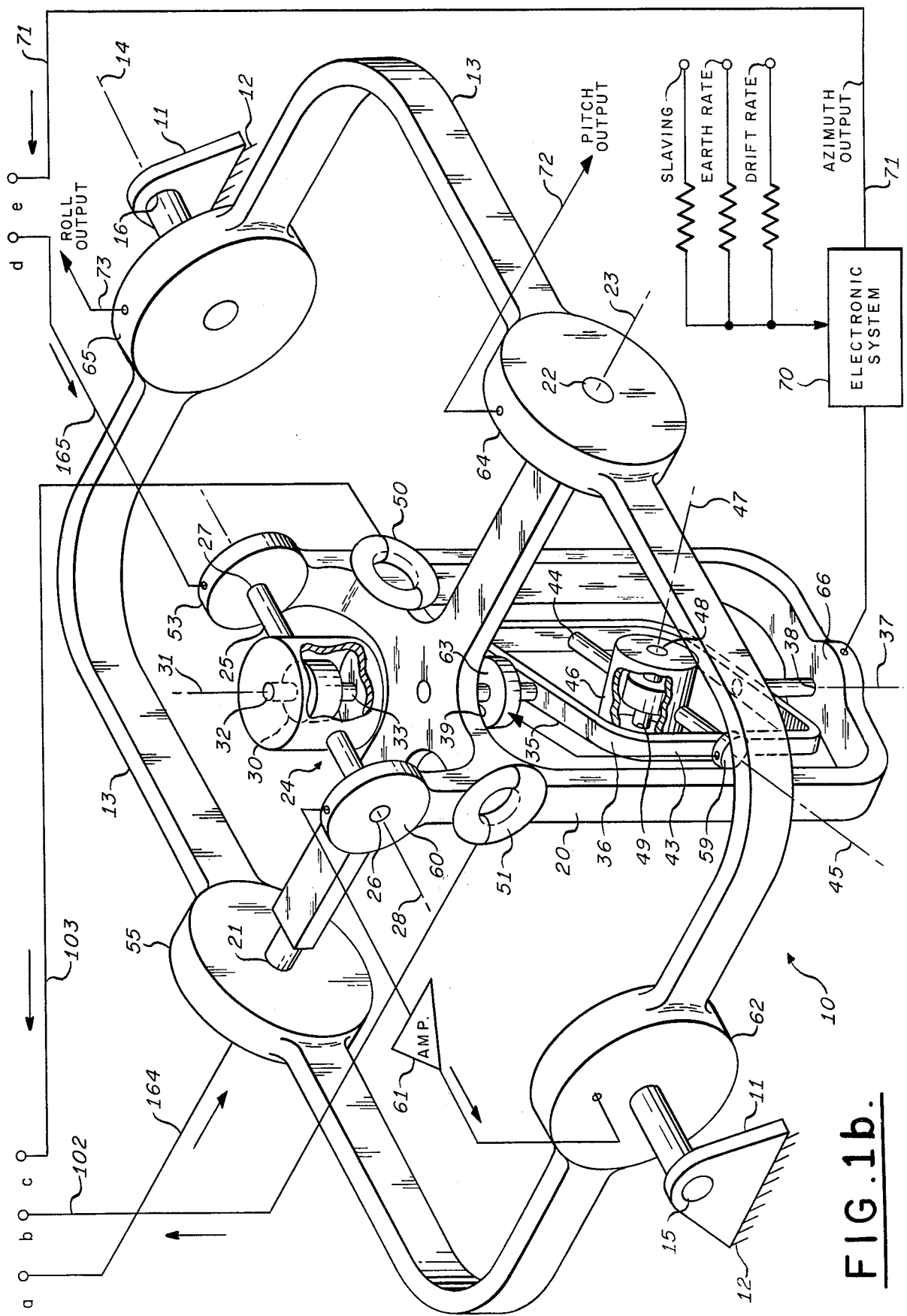
FIG. 1B discloses a schematic isometric view of a gyroscopic stable reference system of the kind useful in the present invention.

A gyroscopic stable platform 10 such as described in the aforementioned Reed patent, when lacking the services of the signal processor of FIG. 1A, suffers from particular defects under some conditions of operation of the aircraft in which velocity errors and accelerometer errors cause such platforms to be precessed erroneously. In such a first order erection control system, erection is largely under control of the pitch accelerometer 50, amplifier 162, and pitch axis torquer 53 on the one hand and of the roll accelerometer 51, amplifier 161, and roll axis torquer 55 on the other. Accordingly, pitch and roll errors will generate corresponding output signals from the respectiive accelerometers 50, 51. These outputs are respectively amplified and are applied to the stable platform 10 via the respective torquers 53, 55. The inherent nature of the stable gyroscopic reference is to integrate the applied torques as it precesses back toward its desired vertical orientation. But the problem is that the acceleration sensors 50, 51 are affected by dynamic accelerations as well as by acceleration due to gravity, not distinguishing between the two. Further, they may reach saturation levels. As a consequence, the gyroscope pitch axis is precessed in error, especially in response to longitudinal acceleration of the craft, while the roll axis is incorrectly disturbed in response to transverse accelerations. A partial remedy that has sometimes been employed is to cut off the erection signal if either the longitudinal or transverse accelerations exceed some arbitrary value such as 0.1g.

The modified second order erection control system of FIG. 1A substantially eliminates the foregoing errors without the need for erection cut off where the acceleration exceeds a threshold such as 0.1g. The system of FIG. 1A examines the aircraft reference velocity $V_R$ and subtracts dynamic accelerations from the accelerometer outputs so that the residual value is representative of gyroscope tilt. For this purpose, the respective acceleration $a_L$ and $a_T$ are supplied via leads 102 and 103 as inputs to similar channels of the FIG. 1A signal processor.

The term $a_T$ on lead 102 at resolver 106 is $\psi_G V_G$ in the absence of any tilt of the gyroscopic system 10. The value of $\psi_G$ is defined as craft turn rate and $V_G$ as longitudinal axis craft velocity. Thus, $\psi_G V_G$ is proportional to transverse acceleration. If there is gyroscope tilt, there will be an additional term representing tilt about the roll axis 14 of the gyroscope system. In a similar manner, the signal on lead 103 will be $V_G$ in the absence of any pitch of the gyroscope gimbal system. In the presence of the latter, there will be an additional term on lead 103 representing tilt about the pitch axis 23.

The first operation performed by the signal processor in FIG. 1A is performed upon the craft-referenced signals appearing on leads 102 and 103. In order to resolve them into the east and north acceleration components $a_E$ and $a_N$ found on the respective resolver output leads 107 and 108, a conventional analog or digital resolver is employed in the usual manner, its setting being determined, according to the analog or digital technique employed, by electrical signals supplied via lead 121 or by a mechanical shaft in lieu thereof operating to rotate one portion of resolver 106 with respect to the other portion. As will be further discussed, other resolutions are accomplished by the similar conventional resolvers 123 and 158. For controlling the operation of these several resolvers, magnetic variation may be set into or generated by the conventional magnetic variation device 166, as by the manual or other adjustment 166a. In this manner, a magnetic variation term of a conventional character is supplied by lead 167 to a conventional analog or digital combining or summation device 168. The second input to summation device 168 is the azimuth heading signal generated by azimuth resolver 66 in FIG. 1B or by a magnetic reference and supplied to summation device 168 via lead 71. The signals on leads 71 and 167 are supplied in the polarity indicated in FIG. 1A. The output electrical signal or mechanical shaft position on element 121 is representative of craft true heading and this true heading signal is used as suggested previously. For example, it may alternatively be employed in a conventional analog servo mechanism or selsyn repeater device (not shown) for positioning one element of each of the resolvers 106, 123, and 158. It will be understood that if a vertical gyroscope alone were being erected by the improved second order system of the present invention and if true heading were available from an inertial navigation system, the magnetic heading signal and the magnetic variation input could be replaced by the inertial navigator true heading signal.

In this manner, the acceleration terms $a_T$ and $a_L$ on the respective leads 102 and 103 are converted in a conventional manner by resolver 106 so that they appear on the separate output leads 107 and 108 as the respective eastward acceleration component $a_E$ and the northerly accelleration component $a_N$. These two resolved acceleration terms are next respectively employed to generate $V_E$ and $V_N$ values, these representing true craft easterly and northerly velocities.

Since the instrumentation associated with generating the term $V_E$ is similar to that for generating $V_N$, the apparatus for generating $V_E$ may be discussed as representative of the two channels. In the basic form of the invention, the term $a_E$ is supplied in the polarity shown to a conventional summation device 113 whose output is subjected to integration in the conventional integrator 117, thus producing the desired easterly velocity term $V_E$. The latter is applied in the polarity shown in the drawing to a conventional summation or combining device 128 whose output is then fed through a conventional multiplier or amplifier 115 having a gain greater than unity. This gain may be fixed or, as will be further discussed, may be variable. From multiplier 115, its output is fed back in the polarity indicated to the second input of summation or combining device 113.

The operation of integrator 117 and its associated summation and feed back circuit elements further involves the comparison by the algebraic summation device 128 of the computed value of $V_E$ with a measured easterly craft velocity component. This latter component is derived from the term $V_R$, which represents a craft-referenced velocity commonly available in aircraft equipped with an air data computer or a doppler navigator system. The term $V_R$ is supplied to input 122 of resolver 123, the latter being operated according to the compensated azimuth data appearing on lead or shaft 121. The function of resolver 123 is thus to resolve the quantity $V_R$ into easterly and northerly components in the channel of the system being discussed. For example, the easterly component of craft air speed appears on lead 124 which introduces it as a second input to algebraic summation device 128. Whenever there is no tilt of the gyroscope 10, the two signal inputs applied to summation device 128 substantially cancel and there is no output error $E_E$ of bipolar character appearing on lead 150. This signal represents the magnitude of the corresponding tilt of gyroscope 10 and is fed back through multiplier 115 and fed forward through switch 153, when closed, as one input to the third resolver 158 yet to be discussed.

From the foregoing, it will be apparent to those skilled in the art that the nature of the second channel, the channel for generating $V_N$, is readily understood. The term $a_N$ is supplied in the polarity shown to a conventional summation or combining device 114 whose output is subjected to integration in the conventional integrator 118, thus producing the desired northerly velocity term $V_N$. The latter value is applied in the polarity shown in the drawing to a conventional summation or combining device 129 whose output is fed through a conventional multiplier or amplifier 116 having a gain greater than unity. Again, the gain of element 116 may be fixed or variable. The output from multiplier 116 is fed back in the polarity indicated to the second input of summation device 114.

The operation of integrator 118 and its associated summation and feed back circuit elements further involves the comparison by the algebraic summation device 129 of the computed value of $V_N$ with a measured easterly craft velocity component. This latter component is also derived from the aforementioned craft-referenced velocity $V_R$ of an air data computer or the like. As before, the term $V_R$ is supplied to resolver 123, the latter being operated according to the compensated azimuth data. The resolver 123 thus resolves the quantity $V_R$ also to provide the northerly component of craft air speed on lead 125 to be introduced as a second input of algebraic summation device 129. Whenever there is no tilt of the gyroscope 10, the two signal inputs applied to summation device 129 substantially cancel and there is no output error $E_N$ on output lead 151. If the two signals applied to summation device 129 do not balance, then there is an error signal $E_N$ of bipolar character appearing on lead 151. This signal represents the magnitude of the corresponding tilt of gyroscope 10 and is fed back through multiplier 116 and is fed forward through switch 154, when closed, as a second input to the third resolver 158.

It will be understood in considering the aforegoing elements and functions discussed in connection with FIG. 1A that they may be provided by employing the analog instrumentation depicted in the drawing or that equivalent known digital instrumentation may be connected and operated in a directly equivalent manner to achieve the desired results, as will be apparent to one with average skill in the analog and digital computer arts. It will further be understood that the several resolvers 106, 123, and 158, in one practical form of the invention, may be simple analog devices of well known character which accept one or more analog voltage terms and which yield at their outputs versions of those input signals resolved with respect to easterly and northerly axes. Should the remainder of the apparatus employ analog techniques, these analog output signals may be used directly. However, if the immediately following portion of the apparatus employs digital techniques, the resolver elements indicated at 106, 123, and 158 may include conventional analog-to-digital converters operating prior to or following the resolution.

Now referring particularly to resolver 158, this element, when analog operation is employed, is a conventional resolver having a rotatable part positioned according to the true heading output of summation device 168 appearing on shaft 121. The error components $E_E$ and $E_N$ appearing on the respective leads 150 and 151 pass through the closed switches 153 and 154 and are applied to resolver 158 via the respective leads 156 and 157. In this manner, the resolver 158 is caused to convert the error signals $E_E$ and $E_N$ back into the coordinate system of gyroscope 10 for use in positioning the gyroscope gimbals so as to reduce substantially to zero the tilt of the gyroscopic system. In one form of the invention, for example, the input data of resolver 158 may be in analog form and may be resolved therein into analog control voltages appearing on leads 159 and 160. If the terms $E_E$ and $E_N$ are in digital form, resolver 158 may resolve them using conventional digital techniques and may also include a digital-to-analog converter for providing the desired respective gyroscope-axis-referenced control signals on leads 159 and 160.

The output of resolver 158 thus appearing on lead 159 is roll error correction term which will normally be amplified by roll amplifier 161 and will then be supplied via lead 164 to the torquer 55 on gimbal 13, as shown in FIG. 1B. In a generally similar manner, the resolved output of resolver 158 appearing on lead 160 is a pitch error correction term and it may be applied via the pitch error amplifier 162 and lead 165 to the pitch torquer 53 situated on gimbal 20 in FIG. 1B.

As noted previously, the second order erection system of the present invention attempts to eliminate errors by examining the aircraft reference velocity $V_R$ and by subtracting dynamic accelerations from the two accelerometer outputs so that the residual value will be a true indication of the tilt of gyroscope 10. In order to make this comparison, a second order of integration over and above that conventionally performed by gyroscope 10 is effectively added by integrators 117 and 118 so that the resolved outputs of the respective accelerometers 50 and 51 are integrated to form inertial velocity terms $V_E$ and $V_N$ which can then be compared successfully to components of the reference velocity $V_R$. As discussed in the foregoing, the accelerometer outputs are resolved with respect to craft heading to form northerly and easterly acceleration terms before the second order integration is undertaken. The latter integrations thus develop the desired inertial north and east velocity terms $V_N$ and $V_E$. The reference velocity $V_R$ is also resolved with respect to craft heading and, by algebraic summation, the respective north and east velocity errors $V_N$ and $V_E$ are derived. These two error terms are resolved back with respect to craft heading into craft coordinates so that pitch and roll velocity errors are created for use in precessing gyroscope 10.

When gyroscope 10 is oriented exactly vertically, the only outputs of the respective accelerometers 50 and 51 are caused by any dynamic acceleration of the craft which may be present. It is seen that these velocity terms are integrated and should match any change that occurred in the reference velocity $V_R$; thus, there will be no precession error signal developed and applied to gyroscope 10 because of the craft acceleration. However, if gyroscope 10 is tilted, a component of acceleration due to gravity is inherently sensed. When this acceleration is integrated, there is no change corresponding to its effect in the reference velocity $V_R$ and, as a consequence, a velocity error is developed which is desirably employed to torque gyroscope 10 back to its vertical orientation.

While the novel system as thus far described is highly advantageous, it has a significant defect appearing in certain modes of operation of the craft. The problem with the novel system is that any errors present in the reference velocity $V_R$ and any errors present in the outputs of acceleromters 50 and 51 cause gyroscope 10 to be precessed in an undesired manner. This problem is of particular significance when the reference velocity term $V_R$ is true air speed derived from a conventional air data computer. The reference velocity term $V_R$ should more properly be ground speed than air speed. When ground speed is used, an additional drift angle signal must be added to the azimuth input on shaft 121 to ensure proper coordinate alignment. The use of air data computer information ignores the effects of wind components in the velocity data perpendicular to the vehicle and is sensitive to dynamic wind components aligned with the vehicle. Further, with respect to a $V_R$ ground speed input as derived from a doppler system, such doppler systems are not always present even in relatively large aircraft, and otherwise are often sensitive to operational problems including problems connected with noisy outputs and craft attitude. In the instance that $V_R$ is obtained from an air data computer, the system illustrated in FIG. 1A whereby the velocity errors $E_E$ and $E_N$ are fed back to the respective integrators 117 and 118, after being adjusted by the gains of multipliers, helps significantly to reduce the problem connected with the use of air speed as $V_R$.

The beneficial effect of the feed back circuits involving the respective multipliers 115 and 116 is further significantly enhanced, according to the present invention, by providing variable, rather than fixed, gain amplifiers or multipliers 115 and 116 in the respective feed back paths of integrators 117 and 118. For example, the easterly acceleration term $a_E$ is supplied by lead 109 to function generator 111, whose output is fed, in turn, to the second input of multiplier 115 for controlling the amplitude of the feed back signal reaching summation device 113. In a similar manner, the northerly acceleration term $a_N$ is supplied via lead 110 to a second function generator 112, whose output is fed to the second input of multiplier 116 for controlling the amplitude of the signal feed back to summation device 114. As noted previously, multipliers 115 and 116 may be conventional analog or digital multipliers, or if the input and output data is in analog form, they may take the form of conventional variable gain amplifiers where the gain is controlled by the respective function generators 111 or 112. The latter elements may take the form of conventional function generation elements that provide a linear or non-linear output, as desired.

The second order integration loops are significantly improved in practice by the controlled operation of the variation of gain in multipliers 115 and 116, whereby the feed back factors of the associated circuits are manipulated. It will be apparent to those of average skill in the flight control art that errors in calculating the desired precession increase as the aircraft rolls into a turn and the accelerometer outputs increase. These errors arise from scale errors on the part of the velocity reference and the accelerometers. Further to inhibit these errors, the gain parameter of each feed back multiplier 115 or 116 is increased, according to the invention, as a function of the input to its associated integrator. For example, the gain of multiplier 115 is increased as a function of the input applied by summation device 113 to integrator 117. The effect is to shorten the effective time constant of the integrating system and to decrease the consequent precessional command generated on lead 156. The channel associated with multiplier 116 and output lead 157 operates in a similar manner. It will be observed that the two feed back operations are handled independently of one another, the feed back system associated with error $E_E$ being increased as a function of $a_E$ and that associated with error $E_N$ being increased as a function of $a_N$. Thus, the gyroscope axis providing a high acceleration input to the signal processor of FIG. 1A and therefore an acceleration value of most doubtful accuracy is subjected to a precession signal having a minimal precession authority. In this manner, the error $E_N$ may be significantly decreased by increasing the gain of the feed back channel. On the other hand, the axis associated with acceleration term $a_E$ for low values of $a_E$, might simultaneously retain normal control, being precessed by undiminished precessive command signal. Thus, the channel with a relatively low acceleration input and relatively more accurate data retains its authority. In this manner, effective cut off of the erection torques is generally limited to the axis about which it is really required, while the axis which is functioning successfully because of reasonable accelerometer outputs remains relatively undisturbed, an arrangement not available in the prior art wherein erection must be cut off about both axes even when only one acceleration input is suspect.

For cooperation with the novel system, it remains desirable to provide total cut off of the erection function where either accelerometer is saturated. This cut off is exercised in terms of the unresolved values of $a_T$ and $a_L$ as shown in FIG. 1A. Under such extreme operating conditions, it is not desirable to generate such gyroscope torquer signals or, in particular, to permit them to control torquers 53 and 55. The cut off of the signals normally applied to the aforementioned torquers is accomplished by supplying measures of the respective acceleration signals $a_T$ and $a_L$ via branching leads 104 and 105 to the respective conventional signal level detectors 119 and 120. Should the outputs of the level detectors appearing on leads 126 and 127 exceed predetermined value, the OR gate 152 is caused in a conventional manner to operate a mechanical linkage 155, opening switches 153 and 154 so that the integrated signals on leads 150 and 151 are not applied for torquing as long as the undesired condition persists.

It will be understood in considering the aforegoing described elements and functions that they may be provided by employing the analog instrumentation generally depicted in the drawing or that known equivalent digital instrumentation may be represented by the drawing and may be connected and operated in a directly equivalent manner to achieve the same desired results, as will be apparent to one with average skill in the analog and digital computer arts. It is clearly evident from the foregoing description that the apparatus of FIG. 1A may comprise a variety of types of elements, such as embodiments including cooperative assemblies of known analog or digital data processing or computing circuits. For example, the several functions performed involve simple arithmetic operations such as additions, subtraction, multiplication, division, and the like. Many examples of both analog and digital computation elements are available in the prior art for accomplishing such computer operations and it is well known that they may readily be coupled together in cooperative relation for attaining desired results. It is furthermore evident that a conventional general purpose digital computer may be employed at least in part for the purpose. It is obviously well within the ordinary skill of digital computer programmers to process the operations discussed above, to create flow charts, and to translate the latter into computer routines and subroutines for performance of such functions along with a compatible computer language for processing input data and instructions to produce outputs directly useful for the control of gyroscope 10 according to the present invention.

It is also evident that the elements comprising the gyroscopic stable reference system of FIG. 1B may be replaced by other configurations with similar desired results. Those skilled in the art will recognize that the gyroscopic stable reference may be replaced by conventional vertical and directional gyroscopic devices or any other gyroscopic element, including those having strapped down configurations, with the single constraint being the availability of orthogonal roll, pitch, and heading data and lateral and longitudinal and, optionally, vertical accelerometer data.

The extension of the application of the variable feed back gain complementary filters of elements 109, 111, 113, 115, and 117 or of 110, 112, 114, 116, and 129 to a third or additional axis of measurement with the same desirable results will also be obvious to those skilled in the art. For instance, a vertical reference velocity derived from an air data source could be combined with vertical accelerometer data to obtain additional precessional information. It is further understood that the accelerometer elements 50 and 51 in FIG. 1B are not limited to the elements described by Fox and Driskill or by Bhat and Buckley, but that other suitable acceleration sensitive elements may be employed.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. In an erection system for a stable gyroscopic reference of the kind having stabilized craft pitch and roll accelerometer means, stabilized craft heading pick off means, and pitch and roll axis gyroscopic reference gimbal torquer means:
   first resolver means responsive to said craft pitch and roll accelerometer means and to said craft heading pick off means for generating first and second outputs respectively representative of craft east and north accelerations,
   first and second means for integrating said respective first and second outputs to yield respective third and fourth outputs respectively representative of craft east and north velocities,
   second resolver means responsive to craft reference velocity and to said craft heading pick off means for generating fifth and sixth outputs respectively representativve of craft east and north reference velocities,
   first combining means for algebraically combining said third and fifth outputs for generating a seventh output representative of craft east velocity error,
   second combining means for algebraically combining said fourth and sixth outputs for generating an eighth output representative of craft north velocity error,
   third resolver means responsive to said seventh and eighth outputs and to said craft heading pick off means for generating ninth and tenth outputs for torquing said respective pitch axis and roll axis gyroscopic reference gimbal torquer means,
   first multiplier means responsive to said seventh output for providing an eleventh output for algebraically combining with said first output before supply of the latter to said first means for integrating said first output,
   second multiplier means responsive to said eighth output for providing a twelfth output for algebraically combining with said second output before supply of the latter to said second means for integrating said second output, and
   means for respectively controlling said first and second multiplier means in accordance with said first and second signals and thereby independently modifying said seventh and eighth signals whereby to modify the authority of said first and second signals in said seventh and eighth signals supplied to said pitch and roll axis gimbal torquer means.

2. Apparatus as described in claim 1 wherein said craft reference velocity is supplied by air data computer means.

3. Apparatus as described in claim 2 further including:
   first and second level detector means respectively responsive to said craft pitch and roll accelerometer means,
   OR gate means responsive to outputs of predetermined level from said first and second level detector means,
   switch means responsive to said OR gate means for rendering said seventh and eighth output signals from said third resolver means ineffective in a second predetermined range of pitch and roll craft acceleration values greater than said first predetermined range thereof.

4. Apparatus as described in claim 1 further including:
   magnetic variation computer means, and
   third combiner means being responsive to said magnetic variation computer means and to said craft heading pick off means, and
   said first, second, and third resolver means being responsive to said third combiner means.

5. In a second order gyroscopic vertical reference erection system for navigable craft, the combination comprising:
   means for providing signals proportional to east and north components of craft acceleration,
   means for providing signals proportional to east and north components of craft velocity,
   integrator means for respectively integrating said acceleration component signals to provide resultant inertial east and north velocity signals,
   means responsive to said craft and resultant velocity signals for providing respective east and north velocity error signals,
   means for supplying said velocity error signals to said respective integrating means whereby to tend to reduce said velocity errors to zero, and
   means for varying the gains of said respective integrator means in accordance with a function of said east and north components of craft acceleration.

6. In the gyroscopic erection system as set forth in claim 5 further including means for varying the respective gains of said integrator means in a sense to decrease the authority of said acceleration signals in said resultant velocity signals.

7. In the gyroscopic erection system as set forth in claim 5 wherein said means for supplying said velocity error signals to said respectively integrating means includes respective multiplier means having one of their inputs responsive to respectively said east and north error signals and the other of their inputs responsive respectively to said east and north components of craft acceleration and means connecting the respective outputs of said multiplier means to the inputs of said respective integrator means.

* * * * *